United States Patent [19]

Wheeler

[11] Patent Number: 4,612,702
[45] Date of Patent: Sep. 23, 1986

[54] FIELD COIL WINDING
[75] Inventor: Dale K. Wheeler, Fallston, Md.
[73] Assignee: Black & Decker Inc., Newark, Del.
[21] Appl. No.: 737,104
[22] Filed: May 22, 1985
[51] Int. Cl.[4] .................... H02K 15/00; H02K 15/06
[52] U.S. Cl. ...................................... 29/596; 29/605; 29/729; 242/1.1 R
[58] Field of Search ................. 29/596, 598, 605, 729, 29/732, 733; 242/1.1 R, 1.1 E; 310/194

[56] References Cited

U.S. PATENT DOCUMENTS

| | | |
|---|---|---|
| 25,281 | 11/1862 | Moore .................................. 242/1.1 |
| 28,831 | 5/1876 | Brown .................................. 310/194 |
| 1,407,033 | 2/1922 | Huggins . |
| 2,304,520 | 12/1942 | Wirtz et al. . |
| 2,328,725 | 5/1942 | Knobel . |
| 2,389,336 | 11/1945 | Wirth . |
| 2,445,937 | 7/1948 | Carpenter . |
| 3,338,526 | 8/1967 | Shaff et al. . |
| 3,411,725 | 11/1968 | Biddison . |
| 3,648,938 | 3/1972 | Dryburgh ........................ 242/1.1 E |
| 3,677,480 | 7/1972 | Schanke ........................... 242/1.1 R |
| 3,750,969 | 8/1973 | Weis . |
| 3,822,830 | 7/1974 | Peters .............................. 242/1.1 R |
| 3,985,164 | 10/1976 | Grwcock .......................... 140/92.1 |
| 4,074,418 | 2/1978 | Pearsall ................................ 29/596 |
| 4,428,113 | 1/1984 | Fischer et al. . |

FOREIGN PATENT DOCUMENTS 569159 5/1945 United Kingdom .
2068787 8/1981 United Kingdom .

Primary Examiner—Mark Rosenbaum
Assistant Examiner—Irene Golabi
Attorney, Agent, or Firm—Edward D. Murphy; Charles E. Yocum; Edward D. C. Bartlett

[57] ABSTRACT

A method and apparatus for winding field coils on internal poles of stator bodies, particularly for electric motors, have a magnet wire feeding needle or needles displaced eccentrically from the central armature axis of the stator body. The or each such feeding needle is disposed to reciprocate and partially rotate on an eccentric axis located between the central armature axis and the internal pole being wound. Due to this eccentricity, during the partial rotation of the feeding needle, the end turns of the coil are lifted above the end of the pole and laid more precisely in place. This enables the conventional winding forms to be eliminated allowing a reduction in the length of the reciprocating stroke of the feeding needle and faster winding with reduction in "snap back" effect. A further cost saving occurs from a shorter length of the end turns resulting in less wire being used.

28 Claims, 10 Drawing Figures

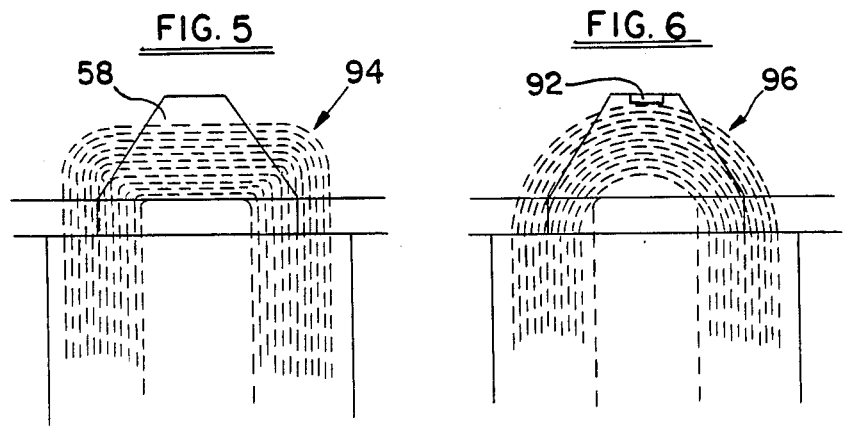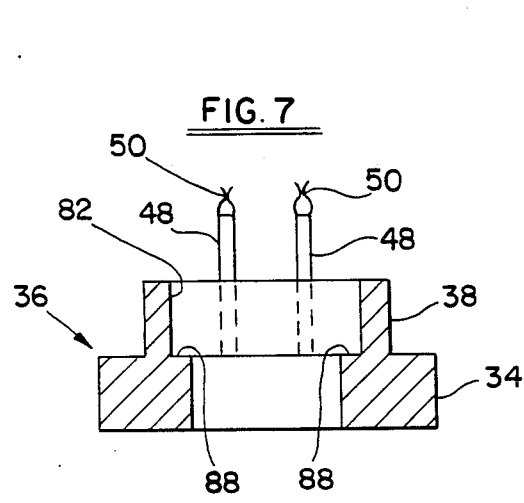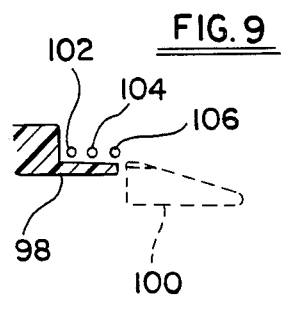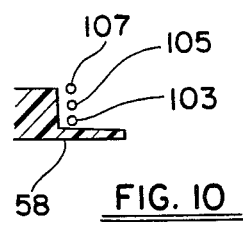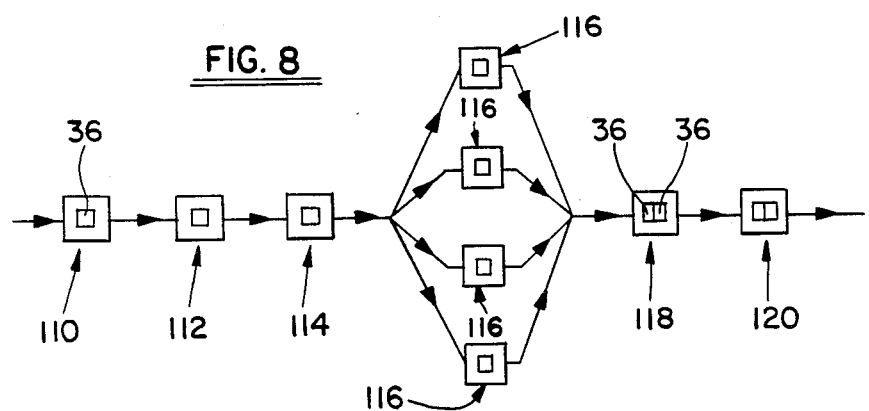

FIELD COIL WINDING

FIELD OF THE INVENTION

This invention relates to field coils of electric motors and similar electrodynamic machines, including the method of and apparatus for winding such field coils on poles of stators.

BACKGROUND OF THE INVENTION

Electric motors commonly have a hollow stator body, such as a laminated stator stack, having internal poles around which are wound field coils. Such field coils can be wound in pairs by a hollow needle having a pair of oppositely directed arms at its leading end from which two magnet wires are simultaneously fed. The needle reciprocates through the hollow stator body on the central axis thereof, which is the rotational axis of the armature in the subsequently completed electric motor, and rotates through 180 degrees about this central axis at each end of each reciprocating stroke to wind two field coils on diametrically opposed internal poles. An integral part of this widing process is to first locate winding forms or horns at the outer ends of the poles to enable the magnet wires to be guided around the ends of the poles during the winding process; these winding forms then being removed after the field coils are wound. Such winding forms are disclosed, for example, in U.S. Pat. Nos. Re. 28,831; 4,074,418; 3,648,938; and 25,281. The latter three patents also disclose and illustrate machines for winding field coils on internal poles. Further, Re. No. 28,831 clearly illustrates the usual configuration of a pair of internal poles of a stator body and also the field coils when wound thereon.

SUMMARY OF THE INVENTION

The invention is based upon the realization that the employment of these temporarily positioned winding forms consumes time to the extent that in a stator assembly production line the field coil winding operation is the slowest operation and effectively a bottle neck; and that a winding process that eliminated the use of winding forms would speed-up the coil winding operation.

It is the object, therefore, of the present invention to eliminate the need for these temporarily positioned winding forms.

It is also an object of the present invention to reduce the time required to wind a field coil on an internal pole of a stator body.

A feature by which these objects are achieved in the preferred embodiment is by having a magnet wire needle which feeds one wire and rotates about an axis which is eccentric to the central axis of the stator body. In this way the needle winds one field coil at a time and causes the magnet wire to be lifted up and over the ends of the pole being wound.

This has the advantage that winding forms are no longer necessary, so eliminating the time previously required to position and then remove these winding forms. Also, due to the needle now reciprocating through a shorter length, shortened by the length of two winding forms, the actual winding time of the field coil is reduced.

A further optional feature of the present invention is to provide two such eccentric needles, preferably driven by a common mechanism and offset on opposite sides of the central axis, for winding coils on two opposite internal poles of the stator body simultaneously.

Accordingly, therefore, there is provided by the present invention a method of manufacturing a stator assembly having a field coil wound on an internal pole of a stator body having a longitudinal passage therethrough defining an armature axis for relative rotation thereabout of an armature, said method comprising feeding a wire and winding the wire about the internal pole by oscillating the feeding of the wire through the passage of the stator body past the pole and, during this oscillating, moving the feeding of the wire along a path concentric with an axis eccentric to the armature axis.

Advantageously, the wire may be engaged and guided directly on the stator assembly during the moving of the feeding of the wire along said path.

The eccentric axis is located between the inner face of the pole and the armature axis. The eccentric axis may be moved relative to the armature axis to vary the eccentricity of the eccentric axis relative to the armature axis as the field coil is being wound.

The end turns of the field coil can be formed of somewhat rectangular shape due to the elimination of temporarily located winding forms and the more precise placing of the end turns as they are raised over the ends of the poles adjacent thereto.

The present invention also provides an apparatus for winding field coils on internal poles of hollow stators, the apparatus comprising one or a plurality of wire feeding members disposed to reciprocate along and partially rotate on axes displaced eccentrically from the central axis of the stator. Each such wire feeding member can be located between the central axis and the internal stator pole it is to wind. In the case of a plurality of spaced apart wire feeding members, these are preferably driven from a common drive mechanism, and are preferably reciprocated in unison.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 5 is a side representation of one end of a stator body depicting the shape of one end of a field coil wound with the machine of FIGS. 4 and 5;

FIG. 6 is a similar representation to FIG. 5 but depicting one end of a conventionally wound field coil;

FIG. 7 is section on the line VII—VII of FIG. 4 of an individual pallet for supporting and positioning a stator body (the stator body being omitted);

FIG. 8 is a schematic representation of a stator assembly production flow line according to the invention;

FIG. 9 is a diagrammatic representation of the laying of end turns during the conventional winding of a field coil; and FIG. 10 is a similar diagrammatic representation of the laying of the end turns of a field coil wound utilizing the present invention.

DETAILED DESCRIPTION OF THE PREFERRED EMBODIMENTS

The preferred embodiment of the invention is shown in FIGS. 3, 4, 7 and 8. FIGS. 1, 2, 5, 6, 9 and 10 are diagrammatic representations to help understanding of the invention.

The invention is particularly for winding field coils on internal poles of stator bodies for electric motors; however, the invention can also be utilized for winding internal field coils for other electrodynamic machines.

Figure 1:
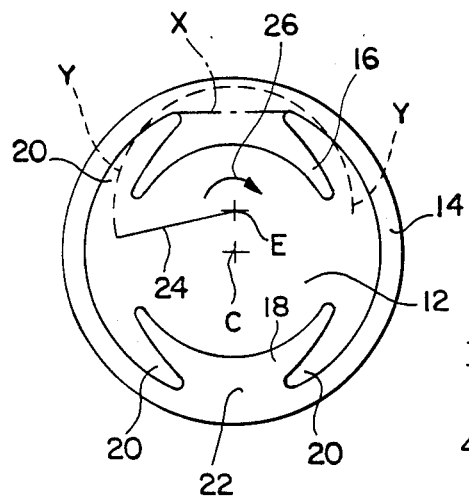
FIG. 1 shows an end view of a stator body and depicts the concept on which the present invention is based.

FIG. 1 shows an end view of an electric motor stator body which is hollow having a central opening 12 extending therethrough for the length thereof. Two opposed internal poles or pole pieces 16, 18 extend into the central opening 12 and extend axially the length of the passage formed by the opening 12. Each pole 16, 18 has portions separated from the cylindrical body part of the stator body 14 by a pair of slots 20 with a neck portion 22 therebetween connecting the pole to the stator body. The whole stator body is preferably formed as a laminated stator stack. The internal surfaces of the poles 16, 18 are cylindrical and are concentric with a central axis C of the stator body 14. In the completed electric motor, an armature rotates about the axis C relative to the stator body 14. A field coil is wound about each pole 16, 18, the turns of the coil passing lengthwise through the slots 20 on each side of the neck portion 22 with end turns passing around the outside of the neck portion 22 at each end of the stator body.

A magnet wire feeding or dispensing member having a rotatable arm 24 dispenses the wire from its outer end as it moves. This arm 24 would, if conventionally used, rotate about the central axis C to lay the end turns across the ends of the poles, and conventionally the arm would reciprocate along the central axis C to draw the wire through the length of the slots 20.

According to the present invention the wire dispensing arm 24 is rotatable about and reciprocates along an eccentric axis E, eccentrically displaced from the central axis C towards the pole 16 being wound. The eccentric arc Y swept by the dispensing end of the arm 24 starts adjacent the entrance to the lefthand side slot 20 and then sweeps up over the neck portion 22, that is well above the chord X across the neck portion 22 connecting the innermost ends of the somewhat tapered slots 20. The arc Y then finishes adjacent the entrance to the righthand slot. By having the center E of this arc Y eccentric to the central armature axis C and located between the pole 16 and the axis C, the arc Y causes the wire being fed to lift up over the pole 16 instead of being initially drawn across the chord X. When the arc Y is completed in the direction of the arrow 26 and the arm 24 makes a reciprocating stroke through the opening 12 along the axis E, the wire just laid by the arc Y will be drawn down across the chord X. Successive turns of the field coil are built up in this way with each end turn portion being lifted up over the pole 16 and then drawn down against previously wound end turns. The distance by which the end turns are lifted above the pole 16 can be selected by selecting the eccentricity of the axis E relative to the central axis C. The less the amount of this eccentricity, the tighter and flatter the end turns are wound; the greater this eccentricity, the higher the middle of the arc Y lifts the wire as it is wound above the pole, and any plastic coil support extending axially therefrom, and above previously wound end turns. Depending on the shape, size, and number of turns in the field coil, the eccentricity of the axis E may remain constant throughout winding or may be stepwise or continuously increased or decreased during the winding of each field coil.

After each partial rotation of the wire feed through the arc Y, the arm moves to the opposite end of the stator body 14 and another arc Y, only in the opposite direction of rotation to the arrow 26, is performed, the arm returning along the axis E to the position shown in FIG. 1 to complete one turn of the coil.

It will be noted that due to the eccentricity of the axis E, the arm 24 can be longer than if it were centered at the central axis C. Also, the arc Y can subtend different angles about the axis E, although for shallow lift the angle subtended about axis E may be less than 180 degrees, for greater lift it should be greater than 180 degrees.

It will also be noted that the arc Y increases in distance from the central axis C as it passes over the pole being wound.

Figure 2:
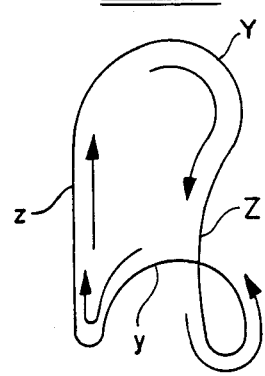
FIG. 2 is a diagrammatic representation of the motion path of the feeding of the magnet wire using the concept of FIG. 1.

FIG. 2 illustrates the motion path of the feeding of the wire, which in FIG. 1 is the radial extremity of the arm 24. The path is turned through 90° downwards from the orientation in FIG. 1. The arc Y is shown at the top, followed by a stretch Z which extends through the righthand slot 20 of the pole 16 in FIG. 1, then through a reverse arc y at the other end of the stator, and finally returning along the stretch z through the slot 20 on the lefthand side of the pole 16, as indicated by the arrows. It is preferable to start the reciprocation strokes Z, z before the wire feed completes the arcs Y, y and to commence the wire feed along the arcs y, Y before the wire feed completes the strokes Z, z. Thus, the wire feed passes through a three dimensional curve as the arm 24 swings through the arcs Y and y, as depicted in FIG. 2, although such three dimensional curves will essentially be concentric to the eccentric axis E and eccentric to the central axis C.

With the arrangement of FIG. 1, a single field coil is wound at a time, the stator body 14 being rotated through 180 degrees after the field coil is completed around the pole 16 in order to wind a field coil on the opposite pole 18. Preferably, however, two such needles 24, one on each side of the central axis C, are employed and simultaneously operated to wind field coils on both poles 16 and 18 at the same time. These two needles may reciprocate axially through the opening 12 in unison or 180 degrees out of phase.

The preferred field coil winding apparatus of FIGS. 3, 4 and 7 will now be described.

Figure 3:
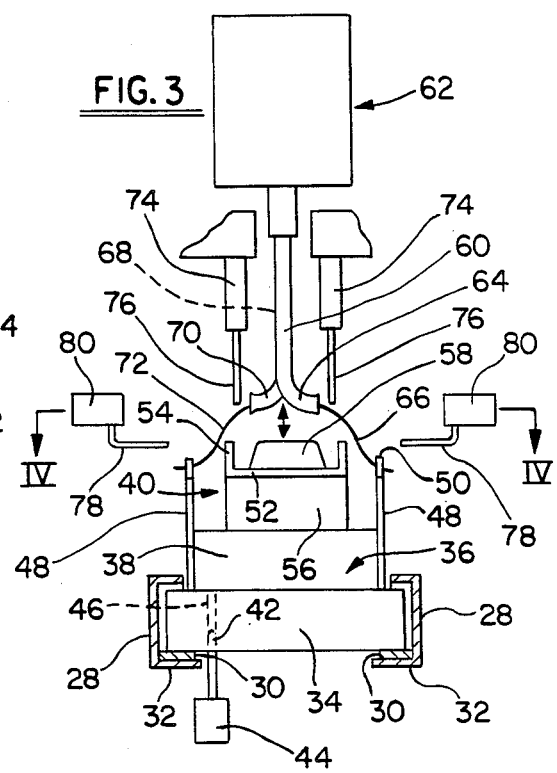
FIG. 3 is a diagrammatic elevational view, with a conveyor in section, of a coil winding machine according to the invention for carrying out the internal coil winding process of the invention.

FIG. 3 shows in section flanged side rails 28 of a conveyor system having a pair of endless belts 30 movable over the bottom flanges 32. A square base portion 34 of a pallet 36 is supported by the belts 30, an upper cylindrical portion 38 of the pallet receiving therein the lower part of a vertically orientated stator assembly 40. A locating pin 42, acuated by an air cylinder 44, engages in a vertical bore 46 in the pallet base 34 to accurately index the pallet below the coil winding machine. A second such locating pin (not shown) engages another vertical bore in the pallet base. Also the stator assembly is accurately orientated in the upper pallet portion 38. Extending upwardly from the pallet base on the opposite sides of the cylindrical portion 38 are posts 48, each having on the top a wire clamping clip 50, there being a pair of such posts on each side (see FIG. 4). The upper end of the stator assembly 40 has a plastic end ring 52, with terminal posts 54, attached to the stator body 56. A plastic coil support 58 extends axially from each pole (see also FIG. 4). A wire dispensing needle 60, in the form of a tube, extends vertically downwards from a drive mechanism 62, the lower end of the needle being curved outwards to form an arm 64 from an outlet at the outer end of which a magnet wire 66 is dispensed. A second similar needle 68, behind the needle 60, similarly extends downwardly from the drive mechanism 62 and has an outwardly curved but oppositely directed arm 70 from an end outlet of which is dispensed a second magnet wire 72. A pair of air cylinders 74 operate push rods 76 to clamp down on the top of the stator assembly 40 to firmly hold it in place during coil winding. The drive mechanism 62 in known manner reciprocates and partially rotates the needle 60 in the same manner as described previously in relation to FIGS. 1 and 2. The drive mechanism 62 simultaneously operates the other needle 68. Wire gripping and locating arms 78, operated by drives 80, take the ends of the wires 66 and 72 and inserts them in the respective wire clips 50 before returning to their inoperative positions shown.

Figure 4:
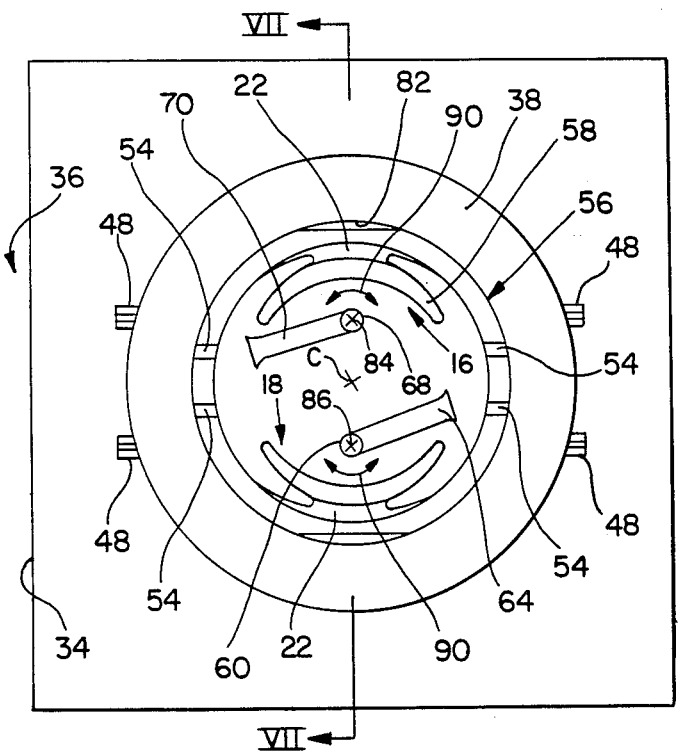
FIG. 4 is a downward view on the line IV—IV of FIG. 3, with some parts omitted for simplicity, and the wire feeding needles lowered from their position in FIG. 3.

FIG. 4 shows a downward view on the line IV—IV of FIG. 3 (with some parts omitted) clearly showing the square pallet base 34 and the cylindrical upper pallet part 38 having a bore 82 in which snugly engages the stator body 56. The relative disposition of the pairs of wire clip posts 48 and pairs of ending terminal posts 54 can be seen. The poles 16, 18 are identical to those described in FIG. 1, however only the neck portion 22 of each pole can be seen, the ends of the poles being covered by the plastic coil supports 58 extending axially therefrom. The arms 64, 70 of the needles 60, 68 extend in opposite directions, and the needles 60, 68 reciprocate and rotate, as indicated by the arrows, about eccentric axes 84, 86, respectively. The eccentric axes 84, 86 are diametrically and equally spaced eccentrically on opposite sides of the central armature axis C of the hollow stator body, each eccentric axis 84, 86 being located between the central axis C and the mid-point of the cylindrically curved surface of the respective pole.

FIG. 7 shows a cross-section of the pallet 36 on the line VII—VII in FIG. 4 and shows a pair of clip posts 48 and the wire clamping clips 50 thereof extending up above the upper portion 38 of the pallet 36. A step-like shoulder 88 is formed, on opposite sides of the vertical bore 82 through the pallet, at the junction between the base 34 and the upper portion 38 of the pallet, these shoulders 88 supporting the lower end of the stator assembly 40 when inserted.

In operation the pallet 36 is indexed below the winding machine 62, 60, 68 etc, by the pair of locating pins 42, the rods 76 clamp the stator assembly 40 in place in the pallet 36, and the arms 78 are operated to clamp the free ends of the magnet wires 66, 72 in the appropriate clamps 50. The needles 60, 68 are then lowered so that their wire feeding arms 64, 70 are disposed just above the upper edge of the coil support 58. The drive mechanism 62 then reciprocates the needles 60, 68 down and up through the central opening of the stator body with the needles being partially rotated, as indicated by the arrows 90, when adjacent each end of the poles. The successive strokes of this oscillatory motion end just beyond the outer ends of the coil supports 58 extending axially from each end of each pole 16, 18. The feeding of each wire 66, 72 follows paths as shown in FIG. 2, but one being effectively the mirror image of the other, to simultaneously wind field coils on the two internal poles 16, 18. When the winding is complete, the needles retract upwardly to their position in FIG. 3, the arms 78 are actuated to clamp the upwardly extending ends of the wires 66, 72 in the other pair of clips 50, and the wires are then cut. The rods 76 move upwardly, the pins 42 retract and the pallet 40 is moved onwards by the conveyor belts 30, the next stator assembly to be wound then being moved into position and indexed by the pins 42.

The magnet wires are fed from the needle arms 64, 70 by being drawn therefrom as the arms 64, 70 move. By laying the end turns of each field coil closely over the ends of the coil supports 58, the amount of "snap back" conventionally experienced, as the wire in the end turn being formed is tensioned during the immediately subsequent reciprocating stroke, is substanially reduced. This "snap back" may be even further reduced by shortening the length of the coil supports 58—or even eliminating them altogether, this being possible due to the tighter, more controlled and accurately formed end turns that are possible with the present invention.

FIG. 5 diagrammatically represents end turns 94 that can be formed by the present invention, and FIG. 6 diagrammatically represents end turns 96 obtained when conventionally employing winding forms at the axial ends of the coil supports. Turning first to FIG. 6, due to the length of the conventionally used winding forms—as long as again or longer than the coil supports—the wire feeding extends a substantial distance past the ends of the poles before returning on the next reciprocating stroke. This not only creates substantial "snap back" (that may at times even break the wire), but causes control of the shaping and positioning of the end turn to be lost as the wire feeding point returns a substantial way back through the stator before the excess length of wire of the end turn is "snapped" tight. This results in end turns 96 shaped as in FIG. 6, and as can be seen, these tend to extend some distance beyond the end of the pole and also desirably require a retaining tab 92 as shown. Now turning to FIG. 5, due to the shorter reciprocating stroke as a result of the elimination of the winding forms, and due to the eccentricity of the axis about which the wire feeding needle partially rotates, the end turns 94 are more precisely and tightly layed across the end of the pole resulting in a somewhat rectangular formation of these end turns 94. It will be appreciated that due to this tighter rectangular formation, which has reduced axial extension, less wire is employed in the field coil, so saving cost and increasing the power of the field coil as less length of wire results in a lower coil resistance with consequential higher amperage. Additionally, the coil support 58 can be axially reduced in length and the end retaining tab eliminated. Additionally, due to the better winding control, the turns of the field coil can be more densely packed in the slots on each side of the pole.

FIGS. 9 and 10 illustrate a further difference between the present invention and conventional internal coil winding employing winding forms. FIG. 9 shows a longitudinal section through a plastic coil support 98 and an abutting winding form 100 (in broken lines) in position. After each end turn is drawn over the winding form 100, it is drawn along the extending coil support 98. Consequently, consecutively wound end turns 102, 104, 106 tend to want to lie side by side transversely across the coil support as the coil is built. On the other hand, as illustrated in FIG. 10, with the present invention, due to the eccentricity of the rotational axis of the wire feeding needle, consecutively wound end turns 103, 105, 107 tend to want to lie one on top of the other as the coil is built, each successive end turn tending to be lifted upon the previous end turn to the limit of the eccentric displacement of the needle axis from the central axis of the stator.

FIG. 8 shows schematically according to an aspect of the invention a preferred manner of incorporating the coil winding of the present invention into a production line with online operating stations. Pallets 36 are successively moved through the production line on a conveyor system as indicated by the arrows. At the first station 110 a fan end ring followed by a stack of laminations are dropped into an awaiting pallet, and the laminations welded together to form a stator body with the fan end ring being attached thereto. At the next station 112, slot insulating liners are inserted in the slots on each side of each pole. At the next station 114, a commutator end ring is loaded on the upper end of the stator body. The conveyor system then moves successive pallets to four coil winding stations 116 as shown in FIG. 3, these four coil winding stations effectively being in parallel and can conveniently all be simultaneously operated from the same drive mechanism 62. As the pallets 36 leave the coil winding stations 116 they are coupled in pairs and moved through a terminating station 118 at which the two pairs of wire ends clamped in the four clips 50 on the pallet are removed and crimped in four respective terminals 54 in the end ring 52, any excess length of wire being trimmed as necessary during this operation. The pairs of pallets 36 are then moved through a bonding station at which a current is passed through the field coils to bond together the resin coating on adjacent turns of the magnet wire. After testing, the stator assemblies are ready for assembly into electric motors.

In conventional production of stator assemblies, the coil winding is the slowest operation and forms a bottleneck tending to limit the production rate of the line. Such conventional coil winding usually requires time for handling, positioning and removing the winding forms, time to terminate the ends of the coil wire to the stator before and after coil winding, and time to wind the field coils. This total time is typically 22 to 24 seconds. With the present invention, by eliminating the winding forms, shortening the strokes of the wire feeding needles, and simplifying wire end securing (with actual termination at a separate faster downstream station), total time at the coil winding station should be reduced to the order of 9 to 10 seconds. All other stations in the production line of FIG. 8 have a total operating time of the order of 3 to 4 seconds except the bonding station 120 with an operating time of 5 to 6 seconds. Thus by using the coil winding process of the present invention and the production line of FIG. 8 as modified by the present invention, the production rate of stator assemblies can be approximately doubled from the 500 to 600 per hour of conventional production lines to about 1000 to 1200 per hour.

The above described embodiments, of course, are not to be construed as limiting the breadth of the present invention. Modifications, and other alternative constructions, will be apparent which are within the scope of the invention as defined in the appended claims.

For example, when winding field coils in stators having end rings without coil supports, or even without end rings, a coil support or supports may be incorporated in the coil winding machine and moved next to the ends of the poles before coil winding to temporily support the radially innermost end turn as these are wound. These supports, which may be somewhat like cylinders with axes parallel to the stator armature axis, may then be moved away from the poles towards the armature axis after coil winding before the wire feeding members are withdrawn, together with these support cylinders, upwards above the wound stator.

Further, the coil winding machine may be located below the conveyor in FIG. 3 and the wire feeding needles inserted upwardly through the pallet into the stator which would be differently supported and clamped in the pallet.

Also, the length of the reciprocating strokes of the wire feeding needles may be varied during the coil winding, e.g. may be stepwise lengthened, particularly with smaller eccentric displacement of the axes 84, 86.

What is claimed is:

1. A method of manufacturing a stator assembly of an electric motor, comprising the steps of:
   positioning a hollow stator body relative to a wire feeding member, said hollow stator body defining an armature axis about which in the electric motor an armature rotates;
   reciprocating the wire feeding member relative to said stator body through successive stokes along a second axis extending internally through said stator body eccentrically of said armature axis;
   partially rotating said wire feeding member relative to said stator body about said second axis during said strokes; and
   emitting a wire from said wire feeding member during said reciprocating and rotating to wind said wire around an internal pole piece of said stator body to form a field coil, said were being wound directly around said pole piece without the employment of temporarily positioned winding forms.

2. The method of claim 1, comprising securing an end of said wire relative to said stator body before winding said field coil, and wherein said emitting step comprises drawing said wire from said wire feeding member by movement of the latter.

3. The method of claim 2, comprising supporting said stator body on a pallet, and performing said securing by attaching said end to said pallet.

4. The method of claim 3, comprising removing said end from said pallet after said field coil has been wound, and then securing said end to a terminal of said stator assembly.

5. The method of claim 4, comprising mounting a terminal end ring on an end of said stator body, and wherein said terminal is supported by said end ring.

6. The method of claim 4, comprising mounting a brush and bearing support structure at an end of said stator body before said field coil is wound, and wherein said terminal is on said support structure.

7. The method of claim 1, comprising moving said eccentric axis relative to said armature axis to vary the eccentricity of said eccentric axis relative to said armature axis as said field coil is being wound.

8. The method of claim 1, wherein said eccentric axis is positioned between said central axis and said pole piece, said partial revolution is through an arc of more than 180 degrees, and as the winding of each turn of said field coil is completed the turn extends around a rectangular path.

9. The method of claim 1, wherein said second axis is positioned between said armature axis and said pole piece, and during said partially rotating said emitting of the wire is swept through an arcuate path that commences on one side of said pole piece, passes radially outwardly of and over said pole piece at a location beyond a respective axial end thereof, and then finishes on an opposite side of said pole piece.

10. The method of claim 1, wherein said partially rotating is through a partial revolution of more than 180 degrees, said emitting of the wire following a corresponding arc of more than 180 degrees which passes radially outwardly of said pole piece.

11. A method of manufacturing a stator assembly having a field coil wound on an internal pole of a stator body having a longitudinal passage therethrough defining an armature axis for rotation thereabout of an armature, said method comprising:
  feeding a wire;
  winding said wire about said internal pole by oscillating the feeding of the wire through said passage past said pole and, during such oscillation, moving the feeding of the wire along a path concentric with an axis eccentric to said armature axis; and
  engaging and guiding said wire directly on said stator assembly during said moving of the feeding of the wire along said path.

12. The method of claim 11, wherein said pole has an inner cylindrical face concentric with said armature axis and said eccentric axis is located between said armature axis and said pole.

13. The method of claim 12, further comprising:
  positioning said stator body on a pallet and securing an end of said wire to said pallet before winding said field coil;
  moving said pallet to a terminating station after winding said field coil; and then
  removing said end from said pallet and terminating the removed end in a terminal of said stator assembly.

14. A method of winding a field coil around an internal pole of a stator body having a central opening therethrough defining a central axis, comprising the steps of;
  drawing a field coil wire from a wire feeding outlet by movement of the latter;
  reciprocating said wire feeding outlet in said central opening past said pole; and
  moving said wire feeding outlet when adjacent each end of said pole about an arc eccentric to said central axis and passing over said pole to wind said wire around said pole into a field coil without the employment of any temporarily positioned members to guide the wire around ends of said pole.

15. The method of claim 14, wherein said pole is shaped concentrically partially around said central axis and said eccentric axis is located between said central axis and said pole parallel to both.

16. The method of claim 14, wherein said stator body has a plurality of internal poles, and comprising winding a plurality of field coils simultaneously with a plurality of wires being drawn from a plurality of wire feeding outlets and moving said wire feeding outlets when adjacent each end of said poles along arcs eccentric to said central axis, each such arc having an axis located between said central axis and a respective one of said poles.

17. The method of claim 16, wherein each of said plurality of wire feeding outlets is reciprocated along a pair of axes parallel to but displaced to opposite sides of said central axis.

18. The method of claim 14, wherein said wire feeding outlet starts to move along said arc while said wire feeding outlet is moving towards an end of a reciprocating stroke.

19. The method of claim 18, wherein said wire feeding outlet commences a return reciprocating stroke before said wire feedlng outlet completes movement along said arc.

20. A method of winding a field coil around an internal pole of a stator having a passage therethrough defining an axis for rotation of an armature therein relative to said pole, said method comprising the steps of:
  feeding a field coil wire;
  oscillating the feeding of said wire internally of the stator past said pole;
  moving the feeding of said wire transversely to said axis adjacent an end of said pole along a path which extends over the end of the pole, said path increasing in distance from said axis over a portion of its length and then decreasing in distance from said axis over a subsequent portion of its length; and
  said oscillating and said moving effecting winding of the field coil around said pole without the employment of temporarily positioned winding forms.

21. The method of claim 20 wherein said path is an arc about a second axis located between said pole and said armature rotation axis and parallel to the latter.

22. A method of manufacturing a stator assembly having a field coil wound around an internal pole of a stator body, the latter having an axial passage therethrough defining an armature axis for relative rotation thereabout of an armature, said method comprising:
  drawing a field coil wire from a wire feeding outlet by movement of the latter:
  reciprocating said wire feeding outlet axially through said passage along each side of said pole and just beyond each end of said pole;
  moving said wire feeding outlet when adjacent each end of said pole through a circular arc having a center eccentric to said armature axis, said center being located between said armature axis and said pole, and a mid-portion of said arc extending radially outwardly of a neck portion of said pole connecting said pole to a main body portion of said stator body; and
  said reciprocating and said moving of said wire feeding outlet effecting winding of said wire around said pole into the field coil without the employment of temporary winding forms, said mid-portion of said arc causing said wire when just beyond the ends of said pole to be raised radially over and above said pole ends to form end turns of said field coil.

23. The method of claim 22, wherein said wire feeding outlet is formed at a radially outer end of an arm extending radially outwardly from a wire feed tube, said reciprocating and moving of said wire feeding outlet being effected by reciprocating said tube along and partially rotating said tube about an axis passing through said center parallel to said armature axis.

24. The method of claim 22, wherein a portion of said pole extends transversely away from said neck portion on each side of said neck portion to define a circumferential slot on each side of said neck portion between said pole and said main body portion of said stator body, and said arc, when viewed along said armature axis, commences in said axial passage, enters one said slot, passes radially beyond said neck portion, and returns to said axial passage through the slot on the other side of said neck portion.

25. A method of winding a field coil on an internal pole of a hollow stator assembly defining a central armature axis, said pole being connected by a neck portion to a body portion of said stator assembly with a slot extending away from each side of said neck portion between said pole and said body portion, said method comprising:

drawing a wire from a dispensing outlet on an arm of a wire dispensing tube by movement of said tube;

reciprocating said tube along an eccentric axis parallel to said armature axis and located between said armature axis and said pole to lay said wire in said slots;

partially rotating said tube on said eccentric axis when said outlet is adjacent either end of said pole to cause said outlet to follow a circular arcuate path about said eccentric axis, said arcuate path passing over the respective end of said pole radially outwardly of said neck portion;

said reciprocating and partially rotating of said tube effecting winding of said wire around said pole to form the field coil; and said arcuate path raising said wire radially above the pole ends with said wire being directly laid on said stator assembly throughout formation of end turns of said field coil, said end turns so being formed without the employment of temporarily positioned winding forms.

26. The method of claim 25, wherein said partially rotating of said tube is through an angle of more than 180 degrees.

27. The method of claim 25, wherein field coils are simultaneously wound on two internal poles of the stator assembly, two wires being drawn from two dispensing outlets on arms of two wire dispensing tubes, the two dispensing tubes being reciprocated along and partially rotated about respective parallel axes located eccentrically on opposite sides of said armature axis between said armature axis and the respective pole being wound.

28. The method of claim 27, wherein said two dispensing tubes are simultaneously partially rotated in opposite directions through an angle greater than 180 degrees.

* * * * *